May 26, 1970 B. H. PINCKAERS 3,514,628

CONDITION RESPONSIVE CONTROL APPARATUS

Filed Dec. 13, 1968

INVENTOR.
BALTHASAR H. PINCKAERS

BY Alfred N. Feldman (signature)

ATTORNEY.

United States Patent Office 3,514,628

Patented May 26, 1970

3,514,628

CONDITION RESPONSIVE CONTROL APPARATUS

Balthasar H. Pinckaers, Edina, Minn., assignor to Honeywell Inc., Minneapolis, Minn., a corporation of Delaware Filed Dec. 13, 1968, Ser. No. 783,597
Int. Cl. G05f *1/44*
U.S. Cl. 307—117 10 Claims

ABSTRACT OF THE DISCLOSURE

A solid state heating control system that uses a bridge network and differential amplifier to fire a silicon controlled rectifier to in turn energize a heating load. The bridge network is paralleled by a four-layer diode which breaks down at a selected voltage level to limit the operation of the system to the early part of the applied alternating current voltage cycle. The differential amplifier utilizes a current comparator to control the firing of the silicon controlled rectifier when there is a need to energize the load, and a charged capacitor is utilized to create a constant differential in operation of the system.

BACKGROUND OF THE INVENTION

The present invention finds particular utility in the field of temperature control where electrical energy is used for heating such as in appliances and in buildings.

SUMMARY OF THE INVENTION

A control system, particularly disclosed as a temperature control system, is involved in the present invention. The disclosed control system utilizes a very small amount of electrical energy itself and therefore has little internal heating. The system is further capable of controlling solid state switching equipment at or near the zero crossover point of the applied alternating voltage and therefore does not generate any appreciable radio frequency interference. The system also incorporates a means for obtaining a fixed and predetermined differential. The invention incorporates a temperature sensing element within a bridge and differential amplifier circuit in which the amplifier output currents are compared in a sensitive switching circuit so that a determination can be made when the associated electrical load control equipment should be energized. The decision by the bridge circuit and current comparator must be made very early in the applied alternating current potential cycle as the bridge circuit is paralleled by a four-layer voltage breakdown type of diode. If the decision to operate the load is made before the four-layer diode conducts, the load is energized. If the bridge is not sufficiently unbalanced prior to the reaching of the breakdown potential of the four-layer diode, the four-layer diode shorts out the bridge for the balance of the applied half cycle and waits for the beginning of the next cycle in which to make a decision on whether or not to energize the load.

The four-layer diode device also limits a potential applied to a capacitor that operates with one of the bridge circuit legs to provide a differential in the system whenever the system is active. The four-layer diode insures that the charge on the capacitor is consistent and therefore that the on-off differential applied to the control of the system is consistent.

DESCRIPTION OF THE PREFERRED EMBODIMENT

Figure 1:
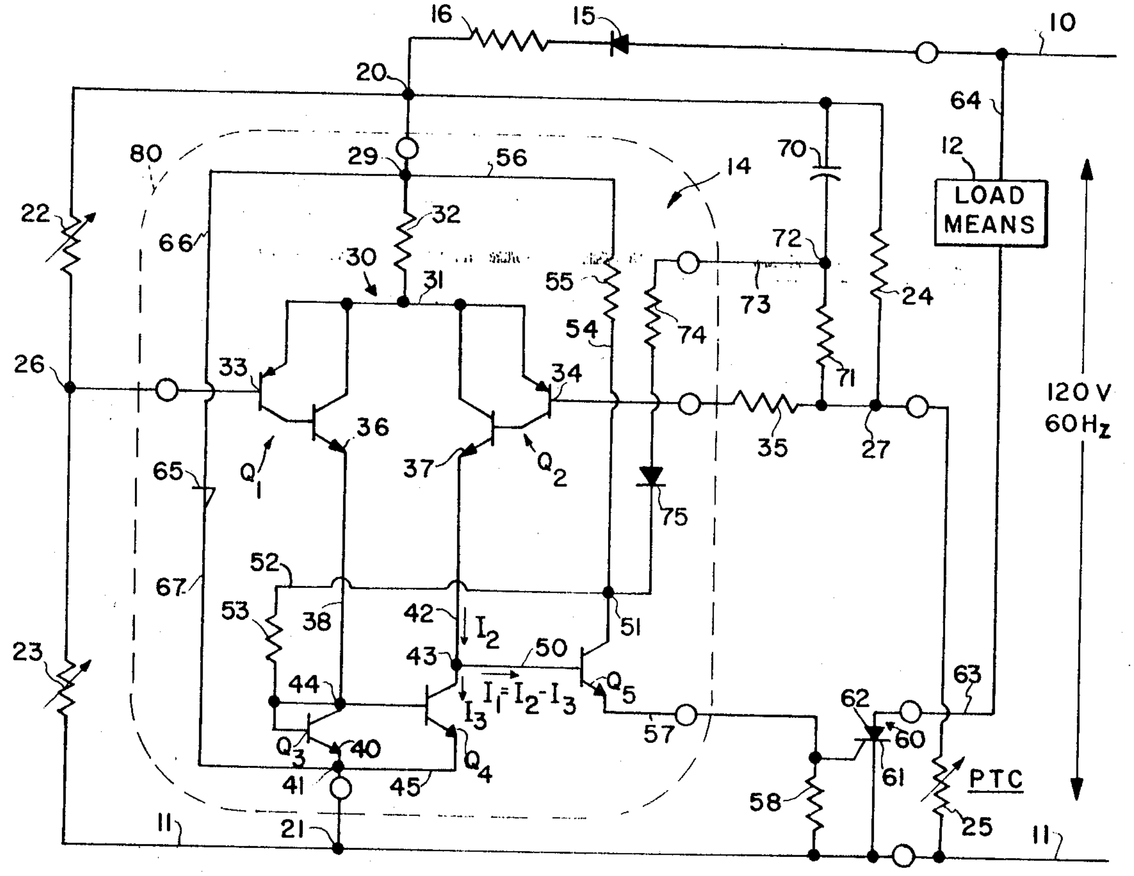
FIG. 1 is a schematic of a temperature control system in its entirety.

In FIG. 1 a complete condition responsive control system in the form of a temperature control system is disclosed. Conventional 120 volt 60 hertz alternating current potential is supplied on conductors 10 and 11 for operating a load means 12 such as an electric heater and for powering the control system generally shown at 14. The control system 14 is connected to the conductor 10 through a diode 15, a resistor 16 and to the conductor 11.

A conventional Wheatstone type bridge is formed between the input junctions 20 and 21 by way of the variable resistors 22 and 23 along with the fixed resistor 24 and a variable sensor resistor 25. The variable sensor resistor 25 is shown as a positive temperature coefficient element. The sensor 25 is exposed to an ambient temperature of a space whose temperature is to be controlled by operation of the load means 12. The variable resistances 22 and 23 are used for adjusting the setpoint of the bridge and for balancing it under normal conditions. Resistors 22 and 23 have a common junction 26 that forms one output of the bridge, while resistor 24 and the sensor 25 have a common point 27 that forms the other output of the bridge.

Connected between the input junctions 20 and 21 is a differential amplifier generally shown at 30. The differential amplifier 30 is shown made up of four transistors in pairs. Each pair is the equivalent of a single P-N-P type of transistor. The disclosure shows an integrated form of device and in discrete form a single transistor would be used for each half of the differential amplifier. The two equivalent P-N-P type transistors have been designated as $Q_1$ and $Q_2$ with a common emitter connection 31 pasing through a resistor 32 to a junction 29 in common with junction 20. The transistor $Q_1$ has a base 33 that is connected to the junction 26 while the transistor $Q_2$ has a base 34 connected through a resistor 35 to the junction 27. The transistor $Q_1$ has a collector or current output point 36 while transistor $Q_2$ has a collector or current output point 37.

To this point a conventional differential amplifier and bridge configuration have been disclosed and it will be understood that when the bridge is balanced the currents in the output emitters 36 and 37 are substantially equal. When the bridge is unbalanced the current difference between the emitters 36 and 37 is used for operating the control system as will be described subsequently.

Emitter 36 is connected by a conductor 38 to a transistor $Q_3$ which has its base and collector short-circuited together to form an equivalent arrangement for a forward biased diode. Emitter 40 is connected to a junction 41 that is common with the junction 21. The emitter 37 of transistor $Q_2$ is connected by conductor 42 to a junction 43. The junction 43 connects to a transistor $Q_4$. The transistor $Q_4$ has its base connected to a junction 44 that is common with conductor 38 and the collector of transistor $Q_3$. The emitter of transistor $Q_4$ is connected by conductor 45 to the junction 41. Current flowing in conductor 42 has been labeled as current $I_2$ while current flowing out of the junction 43 into transistor $Q_4$ has been labeled as $I_3$. During an explanation of the operation of the circuit these currents will be referred to.

Connected to junction 43 by conductor 50 is the base of a transistor $Q_5$. Transistor $Q_5$ has its collector connected to a junction 51 that in turn is connected by conductor 52 and a resistor 53 to the junction 44 of the transistor (diode) $Q_3$. The conductor 52 and resistor 53 provide for a positive feed-back path for transistor $Q_5$ thereby making it a regenerative circuit which switches rather than modulates. Also connected to junction 51 is a conductor 54 and a resistor 55 that are connected to the junction 29 by means of a conductor 56. The emitter of transistor $Q_5$ is connected by a conductor 57 through a resistor 58 to the conductor 11. The resistor 58 forms a bias developing resistor for a silicon controlled rectifier 60 that has its cathode 61 connected to conductor 11 and its anode 62 connected to a conductor 63 that in turn is connected to the load means 12 by way of conductor 64. When the silicon controlled rectifier 60 is in conduction, the load means 12 receives half wave operating current as it is effectively placed directly between conductors 10 and 11.

To complete the elements necessary for the operation of the circuit, a four-layer diode 65 is connected by conductors 66 and 67 across the junctions 41 and 29. It is understood that the four-layer diode 65 is a voltage breakdown means which is capable of acting as substantially an open circuit until some breakdown potential is reached, and then goes into conduction at a very low voltage drop. Typically, a four-layer diode used in the system disclosed would have approximately a 7½ volt breakdown potential and when it is conducting would have approximately 0.8 volt developed or dropped across it.

Also in the condition responsive control system 14 is a capacitor 70 and a resistor 71 that are connected in series, with this series combination being connected across the resistor 24. At a junction 72 between the capacitor 70 and the resistor 71 is a conductor 73 that is connected through a resistor 74 and a diode 75 to the junction 51. The capacitor 70 along with the resistor 74 and the diode 75 provides an energy handling circuit that is used to develop a unique differential for the control system. Its operation will be explained subsequently.

In the control system 14 many of the elements have been encircled by a dashed line 80 which encompasses a six-terminal monolithic integrated circuit. In an actual version of the present invention the six-terminal integrated circuit encompassed all of the elements disclosed in a single chip 80. The entire circuit could be built up of conventional discrete components. Also, the base to emitter current of transistor $Q_5$ has been labeled as $I_1$ for convenience in the following discussion of operation of the system.

Figures 2, 3:
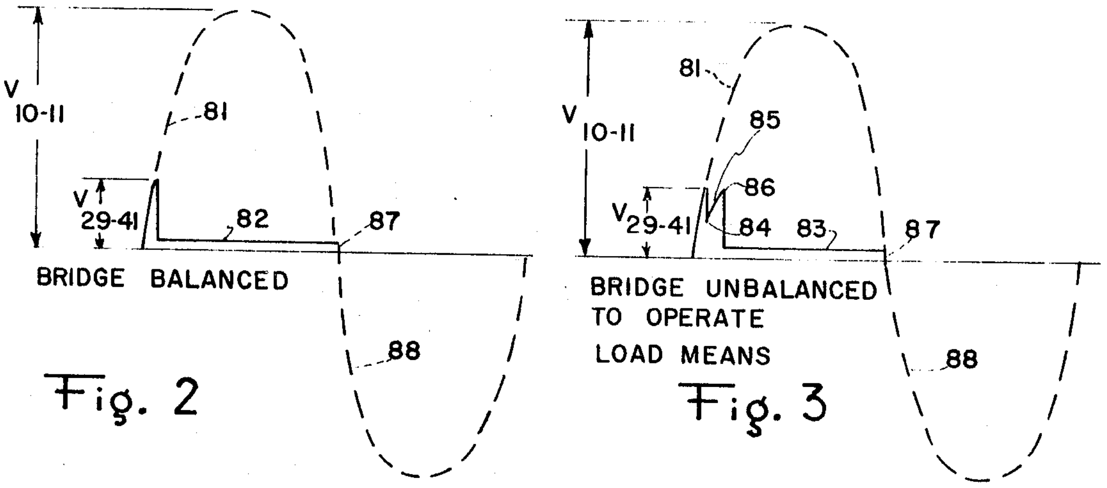
FIGS. 2 and 3 are a pair of wave forms indicating the effect of the four-layer diode on the bridge circuit.

FIGS. 2 and 3 disclose two sets of wave forms under two different operating conditions. The wave form of FIG. 2 is for the system when the bridge is balanced while the wave form of FIG. 3 is when the bridge is unbalanced in such a direction that the load means are on. The wave form generally disclosed at 81 in both FIGS. 2 and 3 are the applied alternating current voltages while the wave form 82 of FIG. 2 is the wave form of the voltage appearing between the junctions 29 and 41 when the bridge is balanced. The wave form 83 of FIG. 3 is the voltage appearing between the junctions 29 and 41 when the bridge is unbalanced to a degree necessary to operate the load means 12.

OPERATION

If it is assumed that the structure of FIG. 1 is powered by an alternating current voltage on conductors 10 and 11 and that the sensor 25 is satisfied so that the bridge is balanced, the differential amplifier 30 has substantially equal currents flowing from collectors 36 and 37. The current comparator means made up of transistors $Q_3$ and $Q_4$ allows substantially all of the current $I_2$ to flow through transistor $Q_4$ thereby having $I_3$ equal to $I_2$. As indicated, when this condition exists the current $I_1$ through the base to emitter of transistor $Q_5$ is negligible and the transistor $Q_5$ is not in conduction. As long as substantially no current flows in transistor $Q_5$ there is no current flow in the resistor 58 and the silicon controlled rectifier 60 remains nonconductive keeping the load means 12 deenergized.

If the temperature at the positive temperature coefficient sensor 25 decreases, the bridge circuit becomes unbalanced and the currents flowing from collectors 36 and 37 become unbalanced, with the current flowing from collector 37 increasing while the current from collector 36 decreases. Under these conditions the current $I_3$ is less than current $I_2$ and a current flows from the base to emitter of transistor $Q_5$. This current flows early in the applied voltage cycle of the wave form 81 as the four-layer diode or voltage breakdown means 65 will allow the potential across the junctions 29 and 41 to increase only to approximately 7½ volts before the voltage breakdown means shorts across the junctions 29 and 41. If the current $I_1$ does not reach a sufficient value to switch the transistor $Q_5$ into conduction prior to the four-layer diode 65 reaching its break over potential, the bridge is shorted out and the system waits for the next applied voltage cycle. If the current flow $I_1$ increases sufficiently to cause transistor $Q_5$ to go into conduction prior to the breakover potential of the four-layer diode 65 being reached, the transistor $Q_5$ conducts. Due to the regenerative feedback circuit, made up of conductor 51 and resistor 53, the action is regenerative in nature and the transistor $Q_5$ switches. The sudden conduction of transistor $Q_5$ draws current from the terminal 29 both through the resistor 55 and conductor 54 and through capacitor 70, resistor 74 and the diode 75, to charge capacitor 70. The sudden increase of current through resistor 16 drops the voltage momentarily at junctions 29 and 41, as is shown at 84 in the curve of FIG. 3. At this time the capacitor 70 being charging, and follows a conventional charge curve 85 until the potential across the junctions 29 and 41 again reaches 7½ volts at a point 86 wherein the four-layer diode 65 again breaks over and starts conducting thereby shortening out the bridge. Since transistor $Q_5$ has gone into conduction a voltage is developed across resistor 58 that fires the silicon controlled rectifier 60 to energize the load means 12. It will be noted that the load means 12 is always fired early in the applied voltage cycle, if at all.

After the applied voltage cycle reaches point 87 on the curve disclosed in FIG. 3, and reverses in direction, as shown at 88 on the curve, the capacitor 70 discharges slowly through a relatively long time constant circuit including the resistor 24 and the resistor 71. The discharge of capacitor 70 through resistor 24 creates a condition in the bridge circuit made up of the resistors 22, 23, 24 and sensor 25, which makes the resistor 24 appear to be of a higher value than it in fact is. This apparent change in resistance of resistor 24 creates a bridge unbalance in a direction to create a differential in operating the control system. This means that when the applied voltage cycle again reaches the beginning of a positive swing 81, the bridge appears to be further unbalanced than it in fact is. The voltage charge appearing in capacitor 70 is constant regardless of line voltage variations or other circumstances since its total peak is limited to the voltage breakdown potential of the voltage breakdown means of four-layer diode 65. In this way the system maintains a constant differential regardless of variations in line voltage or operating conditions.

With the present arrangement the current comparator made up of the transistors $Q_3$ and $Q_4$ insure that the transistor $Q_5$ is operated in a consistent manner. The charge on capacitor 70 insures that the system operates with a constant differential once transitsor $Q_5$ conducts and the silicon controlled rectifier 60 fires. Also, the voltage breakdown means or four-layer diode 65 insures that the system will respond only in the beginning portion of the applied wave form and will operate in a consistent manner at a potential level set by the selection of the breakover point of the voltage breakdown means. These three features taken together provide for a condition responsive control system that is consistent in operation and is sensitive only to variations in the condition being sensed.

Figure 4:
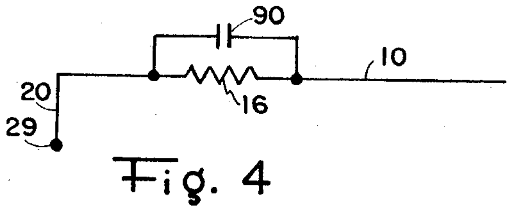
FIG. 4 is a modification of the energizing circuit for the bridge circuit.

In FIG. 4 a circuit modification has been shown wherein the diode 15 has been eliminated and a small capacitor 90 has been placed in shunt with the resistor 16. Since the present system operates on an alternating current, the addition of the capacitor 90 causes a phase shift so that the voltage applied to the temperature control system 14 is slightly advanced in phase as compared to the voltage applied to the load means 12 and the silicon controlled rectifier 60. The firing of the silicon controlled rectifier 60 can thus be synchronized with the zero cross-over point of the applied alternating voltage. The balance of the operation of the system is the same as that previously described.

The present system can be utilized for any condition responsive type of control but is of particular utility in the temperature control field where a bridge configuration is utilized and where it is desired to establish a consistent differential regardless of variations in the applied line voltage and where it is desired to fire a solid state switching device such as a silicon controlled rectifier at or near the zero phase point to eliminate radio frequency interference. While the preferred arrangement of the system has been disclosed, modifications utilizing the concepts involved could be readily adapted by one skilled in the art and the applicant therefore wishes to be limited in the scope of this invention solely by the scope of the present claims.

The embodiments of the invention in which an exclusive property or right is claimed are defined as follows:

1. A condition responsive control apparatus, including: condition responsive means having differential current outputs upon variation in a condition; periodically varying voltage source means and voltage breakdown means connected to said condition responsive means to energize said condition responsive means only prior to the voltage breakdown means conducting; current comparator means having inputs connected to said differential current outputs and including current output means which provides a control output current when said condition responsive means senses a variation in said condition; and regenerative switch means connected to receive said control output current and adapted to operate load means early in the period of variation of said varying voltage source means to restore said condition.

2. A condition responsive control apparatus as described in claim 1 wherein said condition responsive means is temperature responsive bridge means and the varying condition is temperature.

3. A condition responsive control apparatus as described in claim 1 wherein said voltage breakdown means is a four-layer diode to thereby substantially short circuit said condition responsive means.

4. A condition responsive control apparatus as described in claim 1 wherein said regenerative switch means is transistor means including positive feedback means.

5. A condition responsive control apparatus as described in claim 1 wherein said regenerative switch means is connected to operate silicon controlled rectifier means.

6. A condition responsive control apparatus as described in claim 1 wherein said condition responsive means includes electrical energy storage means connected between said voltage source means and said regenerative switch means; said energy storage means being charged upon operation of said regenerative switch means and discharged through said control responsive means to create a differential operating condition for said apparatus.

7. A condition responsive control apparatus as described in claim 6 wherein said condition responsive means is temperature bridge means including a plurality of impedance legs and the varying condition is temperature; and said energy storage means is capacitor means discharging through one of said legs to create a differential operating condition for said bridge means.

8. A condition responsive control apparatus as described in claim 7 wherein said voltage breakdown means is a four-layer diode.

9. A condition responsive control apparatus as described in claim 8 wherein said regenerative switch means is transistor means including positive feedback means.

10. A condition responsive control apparatus as described in claim 9 wherein said regenerative switch means is connected to operate silicon controlled rectifier means.

References Cited

UNITED STATES PATENTS

| | | | |
|---|---|---|---|
| 2,429,466 | 10/1947 | Jones | 323—19 X |
| 3,175,076 | 3/1965 | Fox et al. | 219—494 |
| 3,341,769 | 9/1967 | Grant | 323—22 |
| 3,377,545 | 4/1968 | Tueit | 323—22 X |
| 3,395,265 | 7/1968 | Weir | 219—499 X |
| 3,444,456 | 5/1969 | Codichini | 219—494 X |

ROBERT K. SCHAEFER, Primary Examiner

T. B. JOIKE, Assistant Examiner

U.S. Cl. X.R.

219—494, 499, 501; 323—22